July 29, 1930.  F. C. BROCK ET AL  1,771,872
COVERING FOR SEATS OR BACKS THEREOF
Filed July 10, 1928

INVENTORS
Ivan L. Smith
Frederick C. Brock
BY
ATTORNEY

Patented July 29, 1930

1,771,872

UNITED STATES PATENT OFFICE

FREDERICK C. BROCK AND IVAN L. SMITH, OF CLEVELAND, OHIO

COVERING FOR SEATS OR BACKS THEREOF

Application filed July 10, 1928, Serial No. 291,596, and in Canada January 3, 1928.

Our invention relates to coverings for seats or backs thereof. It pertains, particularly, to coverings for the seat cushions, seat backs, interior side panels and those sections of an automobile that are ordinarily upholstered. Further description, however, will make it evident that our invention is capable of being applied to other articles, such as furniture.

The subject-matter of this application is a continuation in part of our application Serial No. 166,316, filed February 7, 1927, and entitled Interior coverings for automobiles.

In the preferred form, our invention contemplates the provision of coverings which are formed partially of an elastic material and partially of a non-elastic material. Preferably, the elastic material used is a knitted material, while the non-elastic material is desirably of a closely-woven character such as has been commonly used in seat covers hitherto constructed.

One of the advantageous features of our invention resides in the fact that the elastic material will give sufficient flexibility and elasticity to the covering as a whole to permit the springs in the seats and seat backs to function freely when the coverings are applied, instead of having their action retarded or being "spring-bound", as is frequently the case when ordinary non-elastic coverings are used. At the same time, the closely-woven non-elastic material may be used to provide those parts of the seat cover which are subjected to the most severe wear. Thus, it is possible to provide the desired elasticity and, at the same time, obtain the requisite longevity.

Another advantageous feature of our invention arises from the use of the proper amount of elastic material in that we are enabled to produce one set of seat covers which is capable of adequately fitting more than one seat structure. Heretofore, seat covers have ordinarily been made from "master patterns" of the seats of each individual model of the various makes of automobiles. Dealers who carry a complete line of coverings of this type are compelled to have different sized coverings in stock for every one of the many makes of automobiles and the different yearly models thereof. With seat covers constructed in accordance with our invention, it is only necessary for a dealer to have a small stock of coverings, since one seat cover may be stretched to fit many different sizes of seats.

One embodiment of our invention is shown in the accompanying drawings wherein similar characters of reference designate corresponding parts and wherein.

Figure 1:
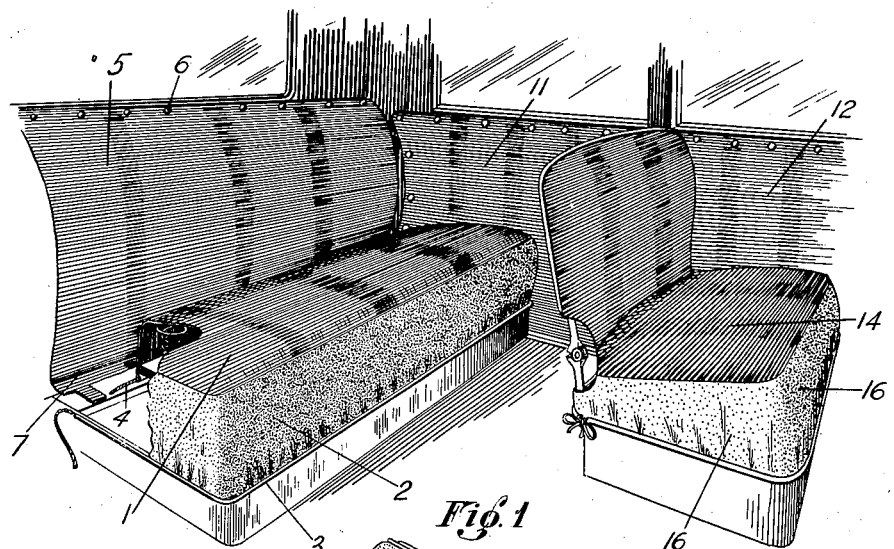
Figure 1 is a perspective view of the interior of an automobile, showing our coverings applied thereto.
Figure 2:
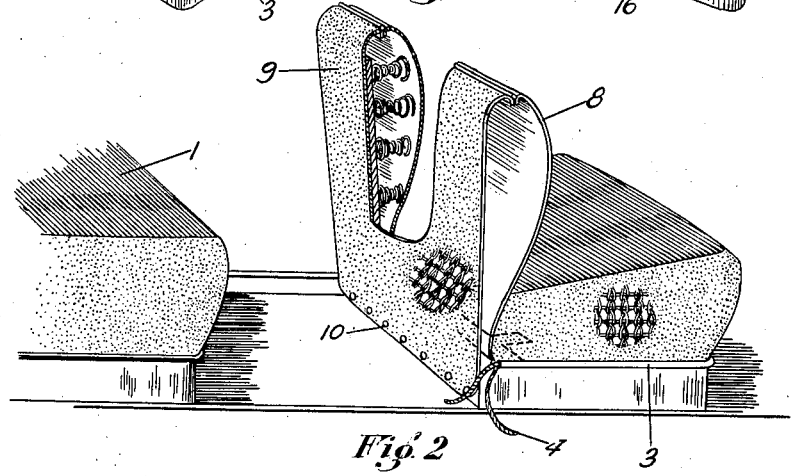
Figure 2 is a perspective view of seat structure for automobiles, illustrating the interior construction of the seat and showing our seat cover units applied thereto.

In the drawings, with particular reference to Figures 1 and 2, our seat covering structure comprises a seat cushion covering, a seat back covering, and side and door panel coverings.

The seat cushion covering is preferably constructed of a closely-woven fabric portion 1 designed to cover the upper surface of a seat and preferably extending over the corners thereof. This portion of the seat covering receives the greatest wear, and being of closely-woven material is best adapted to endure this wear.

Connected to the edges of this closely woven material 1, is a knitted material 2 which constitutes the skirt of the seat covering and which extends downwardly over the side of the seat cushion. Being of knitted material, it is elastic and may be stretched to conform to various sizes of seat cushions without danger of tearing or undue strain. It is also capable of freely yielding in response to any pressure upon or rebound from the springs of the seat cushion.

The lower end of this skirt 2 of this seat cushion covering is preferably provided with a hem 3 extending around the front and sides of the seat cushion. This hem 3 is designed to receive an elastic cord or draw string 4 which may also extend around the rear of the seat cushion and have its end secured at any desired place. This cord will be utilized to firmly secure the covering for the seat cushion in proper position thereon.

The covering 5 for the back of the rear seat is preferably constructed entirely of closely-woven material, although it may, if desired, be provided with strips of elastic material. In the form shown, it is designed to be secured at its upper side by pin fasteners, upholstery tacks or other securing means 6. Its lower side is adapted to extend down behind the seat cushion as shown at 7 in Figure 1.

In Figure 2, the covering for the seat cushion is shown as being of the same construction as the covering for the seat cushion of the rear seat illustrated in Figure 1. The covering for the seat back, however, is preferably provided with a front covering portion 8 of closely-woven non-elastic material and a covering 9 for the rear of the seat back which is preferably of knitted or other elastic material. This covering for the rear of the seat back may be secured to the portion 8 by a chain stitch or in any other desired manner. It is preferably secured adjacent the bottom of the seat back by the securing means 10.

The coverings for the side and door panels are designated 11 and 12. They are preferably formed entirely of closely-woven or non-elastic material. However, they may be constructed partially of elastic material in a manner that will be well understood.

Figure 3:
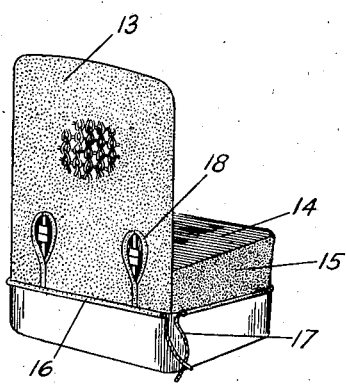
Figure 3 is a perspective view showing our individual coach seat coverings applied to an individual coach seat.

The individual coach seat covering is shown best in Figures 1 and 3. It preferably comprises a seat back covering and a seat cushion covering, these parts being joined together, preferably at the terminating point of the portion adapted to cover the top of the seat and the portion adapted to cover the back of the seat as clearly shown in Figure 1. The covering for the rear surface of the seat back is preferably formed of knitted or elastic material as shown at 13. The covering 14 for the front of the seat back and the top of the cushion is preferably formed of closely-woven non-elastic material. The covering for the top of the seat cushion is preferably provided with a skirt structure 15 of knitted or elastic material. A hem 16 is desirably provided on the lower edge of the skirt and this hem is also extended over into the covering 13 for the rear of the seat back. A drawstring 17 is disposed in the hem 16 and may be tied as desired to retain the seat cover in position upon the seat. This seat cover is preferably provided with cutaway portions 18 to permit the seat back to be folded without interference from the seat cover.

The various parts of the seat covering are preferably secured together with a chain stitch.

In the production of our covering structure, we preferably cut the non-elastic material so that it will conform to the contour of the surface being covered. In this manner, the non-elastic material fits the surface being covered substantially without wrinkles, while the elastic material retains close contact of the entire seat cover with the seat structure. It will be understood that the term "seat covers" or "seat covering" is intended to be construed to include the coverings for the side and door panels and the back structure, as well as the seat cushion structure.

It will be seen that we have provided a covering for seats or the backs thereof which is particularly adapted to cover the interior of automobiles and which is also suitable for use with furniture structure embodying spring cushions and varying as to size. Our structure of covering is such that it combines flexibility and capability of long wear. At the same time, it is sufficiently elastic so that one set of seat covers may be utilized to cover seat structures of varying dimensions. Furthermore, the structure is such that, when applied, the normal resiliency of the seat and back structure and other resilient parts will still remain intact.

Having thus described our invention, what we claim is:

1. A seat cover having a covering portion for the front of the back rest and the top of the seat fabricated of non-elastic material, and a skirting depending from the edges of the covering portion for the top of the seat fabricated of elastic material and adapted to fit the side edges of said seat.

2. A seat cover comprising a cover for the front of the back rest fabricated of non-elastic material, and a portion fabricated of elastic material and connected to the upper edge of the cover for the front of the back rest and constructed to extend over onto the back surface of the back rest.

3. A seat cover having a top portion fabricated of non-elastic material provided with means whereby the same will fit seats of different sizes, said means consisting of a skirting fabricated of elastic material.

4. A seat cover comprising a portion of non-elastic material, and a skirting portion of elastic material whereby said latter portion may contract or be stretched so that the seat cover may snugly fit seats of different sizes.

5. A seat cover comprising a main body portion of non-elastic material which substantially covers that portion of the seat with which the occupant of the seat normally comes in contact, and a supplementary skirting portion consisting of elastic material whereby such portion may contract or be stretched to fit the cover to seats of different sizes.

6. A seat cover comprising a section adapted to substantially cover that portion of the seat with which the occupant of the seat normally comes in contact, this section being constructed of non-elastic material, and a section connected thereto and designed to extend over onto that portion of the seat which is not ordinarily materially contacted with by the occupant of the seat, said last named section being of elastic material whereby the seat cover will automatically adjust itself to fit seats of different sizes.

7. A seat cover comprising a section of non-elastic material adapted to cover that portion of the seat with which the occupant of the seat normally comes in contact, and a section connected thereto and designed to extend over onto the sides, front and back of the seat, said last named section being of elastic material whereby this elastic section will contract or stretch to permit the application of the seat cover to seats of different sizes.

In testimony whereof we hereby affix our signatures.

FREDERICK C. BROCK.
IVAN L. SMITH.